(12) United States Patent
Kwon

(10) Patent No.: US 11,106,913 B2
(45) Date of Patent: Aug. 31, 2021

(54) METHOD AND ELECTRONIC DEVICE FOR PROVIDING OBJECT RECOGNITION RESULT

(71) Applicant: Samsung Electronics Co., Ltd., Suwon-si (KR)

(72) Inventor: Keun-joo Kwon, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 101 days.

(21) Appl. No.: 16/466,516

(22) PCT Filed: Nov. 29, 2017

(86) PCT No.: PCT/KR2017/013792
§ 371 (c)(1),
(2) Date: Jun. 4, 2019

(87) PCT Pub. No.: WO2018/124500
PCT Pub. Date: Jul. 5, 2018

(65) Prior Publication Data
US 2020/0082170 A1 Mar. 12, 2020

(30) Foreign Application Priority Data
Dec. 26, 2016 (KR) .................... 10-2016-0179314

(51) Int. Cl.
*G06K 9/00* (2006.01)
*G06T 7/73* (2017.01)
(Continued)

(52) U.S. Cl.
CPC ....... *G06K 9/00671* (2013.01); *G06K 9/6215* (2013.01); *G06Q 30/0641* (2013.01);
(Continued)

(58) Field of Classification Search
CPC .......... G06Q 30/0641; G06T 2200/24; G06T 2207/30244; G06T 7/73; G06T 7/74
See application file for complete search history.

(56) References Cited

U.S. PATENT DOCUMENTS 8,032,469 B2 * 10/2011 Atallah .................. G06N 3/02
706/18
9,087,271 B2 * 7/2015 Chechik ................. G06F 16/58
(Continued)

FOREIGN PATENT DOCUMENTS

JP 2011-176574 A 9/2011
KR 10-1191172 B1 10/2012
(Continued)

OTHER PUBLICATIONS

Girod et al, Mobile Visual Search, Jun. 15, 2011, IEEE Signal Processing Magazine.
(Continued)

*Primary Examiner* — Ross Varndell
(74) *Attorney, Agent, or Firm* — Jefferson IP Law, LLP

(57) ABSTRACT

Provided is a method of providing a recognition result of an object, the method including: detecting an object included in an image; determining an image group corresponding to the detected object through matching between the image and image groups each grouped for a same object; and outputting information of the image group in a front direction of the object of the determined image group, estimated from the image, based on a photographing condition of the determined image group and a photographing condition of the image.

15 Claims, 11 Drawing Sheets

(51) Int. Cl.
*G06K 9/62* (2006.01)
*G06Q 30/06* (2012.01)

(52) U.S. Cl.
CPC ............ *G06T 7/74* (2017.01); *G06T 2200/24* (2013.01); *G06T 2207/20081* (2013.01); *G06T 2207/30244* (2013.01)

(56) References Cited

U.S. PATENT DOCUMENTS

| | | | | |
|---|---|---|---|---|
| 9,471,603 | B2* | 10/2016 | Kim | G06F 16/583 |
| 2007/0009135 | A1* | 1/2007 | Ishiyama | G06T 7/20 |
| | | | | 382/103 |
| 2012/0008830 | A1* | 1/2012 | Yoshii | G06T 7/74 |
| | | | | 382/103 |
| 2014/0079297 | A1* | 3/2014 | Tadayon | G06K 9/00288 |
| | | | | 382/118 |
| 2014/0270540 | A1* | 9/2014 | Spector | G06T 7/579 |
| | | | | 382/199 |
| 2014/0289323 | A1* | 9/2014 | Kutaragi | H04L 67/42 |
| | | | | 709/203 |
| 2016/0179846 | A1* | 6/2016 | Tobita | G06K 9/6267 |
| | | | | 382/305 |
| 2017/0289453 | A1* | 10/2017 | Makita | G06T 7/70 |
| 2019/0079654 | A1* | 3/2019 | Moon | G06F 3/04855 |
| 2019/0130216 | A1* | 5/2019 | Tomioka | G06K 9/6267 |
| 2020/0160540 | A1* | 5/2020 | Rastgar | G06T 7/251 |

FOREIGN PATENT DOCUMENTS

| | | |
|---|---|---|
| KR | 10-2013-0120663 A | 11/2013 |
| KR | 1020140132452 A | 11/2014 |
| KR | 10-2015-0127503 A | 11/2015 |

OTHER PUBLICATIONS

International Search Report dated Mar. 23, 2018, issued in International Patent Application No. PCT/KR2017/013792.

* cited by examiner

METHOD AND ELECTRONIC DEVICE FOR PROVIDING OBJECT RECOGNITION RESULT

TECHNICAL FIELD

The present disclosure relates to a method and electronic device for providing a recognition result of an object, and more particularly, to a method and electronic device for providing a recognition result of an object included in an image in a direction of the object.

BACKGROUND ART

With the development of multimedia technology and computer technology, users are able to receive various services through electronic devices. Specifically, with the development of image processing technology, users can receive recognition results in a front direction of an object included in an image through electronic devices.

However, typically, there are difficulties in accurately estimating a similar image only using similarity estimation between individual images when searching for a similar image to determine a front direction of an object from an image. Therefore, there is a demand for technology enabling an electronic device to automatically search for an image that is similar to an image from which a recognition result of an object will be provided, to more accurately search an image group corresponding to the object using similarities of a plurality of images, and to estimate a front direction of the object through the image group.

DESCRIPTION OF EMBODIMENTS

Technical Problem

Provided are an electronic device and method for estimating a front direction of an object included in an image and providing a recognition result of the object in the estimated front direction.

Solution to Problem

An electronic device according to a first aspect of the present disclosure includes: a memory storing computer executable instructions; at least one processor configured to execute the computer executable instructions to detect an object included in an image, to determine an image group corresponding to the detected object through matching between the image and image groups each grouped for a same object, and to estimate a front direction of the object of the determined image group in the image based on a photographing condition of the determined image group and a photographing condition of the image; and an outputter configured to output information of the image group in the estimated front direction.

A method of providing a recognition result of an object, according to a first aspect of the present disclosure, includes: detecting an object included in an image; determining an image group corresponding to the detected object through matching between the image and image groups each grouped for a same object; and outputting information of the image group in a front direction of the object of the determined image group, estimated from the image, based on a photographing condition of the determined image group and a photographing condition of the image.

The method may further include: receiving a user input of selecting a displayed graphical user interface; and accessing a site for purchasing the object of the image group based on the information of the image group.

The method may include multiplying the first similarities by a weight based on a difference between the estimated photographing conditions of the image and summing results of the multiplying.

The method may include learning a criterion for determining the first similarities.

The method may, when the image is a depth image, include: determining a three-dimensional model corresponding to the detected object through matching between three-dimensional models of a plurality of objects and the depth image; and outputting information of the three-dimensional model in a front direction of the object of the three-dimensional model in the depth image, based on depth information of the depth image.

The method may include tracking movement of a camera capturing the image; and outputting information of the determined image group in a front direction of the object of the determined image group, estimated from the image, based on a photographing condition of the determined image group and a photographing condition of the image changed according to the movement of the camera.

Also, a third aspect of the present disclosure provides a computer-readable recording medium storing a program for executing the method of the second aspect on a computer.

BEST MODE

Figure 1:
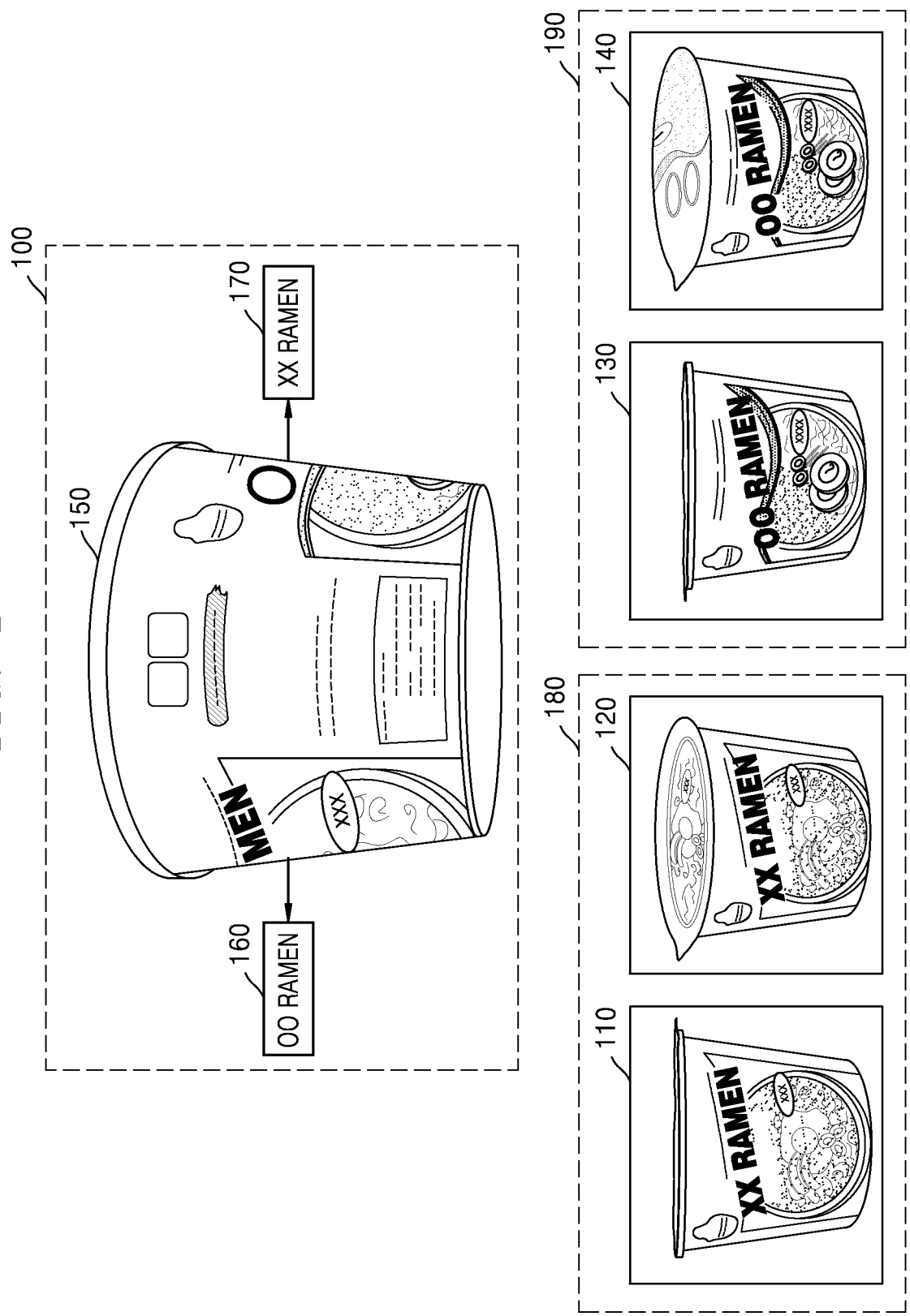
FIG. 1 shows an example of an electronic device providing a recognition result of an object, according to an embodiment.

An electronic device according to an embodiment may include: a memory storing a computer executable instruction; at least one processor configured to execute the computer executable instruction to detect an object included in an image, to determine an image group corresponding to the detected object through matching between the image and image groups each grouped for a same object, and to estimate a front direction of the object of the determined image group in the image based on a photographing condition of the determined image group and a photographing condition of the image; and an outputter configured to output information of the image group in the estimated front direction.

MODE OF DISCLOSURE

Hereinafter, embodiments of the disclosure will be described in detail with reference to the accompanying drawings so that the disclosure may be readily implemented by those skilled in the art. However, the disclosure is not restricted by these embodiments but can be implemented in many different forms. Also, in the drawings, parts irrelevant to the description are omitted for the simplicity of explanation, and like reference numerals refer to like elements throughout the specification.

It will be understood that when a component is referred to as being "connected" to another component, it can be "directly connected" or "electrically connected" to the other component with an intervening component. Also, it will be understood that when a certain part "includes" a certain component, the part does not exclude another component but can further include another component, unless the context clearly dictates otherwise.

Hereinafter, the disclosure will be described in detail with reference to the accompanying drawings.

FIG. 1 shows an example of providing a recognition result of an object by an electronic device, according to an embodiment.

Referring to FIG. 1, an electronic device according to an embodiment may detect an object 150 included in an image 100.

The object 150 may be included in the image 100, and means a single subject that is distinguished from other subjects in the image 100 and recognized. For example, the image 100 may include at least one object, and the electronic device may detect the at least one object from the image 100.

The image 100 may have been captured by a camera included in the electronic device. For example, the camera included in the electronic device may be a depth camera. For example, the electronic device may execute a camera application to capture the image 100. Or, the electronic device may acquire the image 100 for providing a recognition result of the object 150 from among images stored in advance in the electronic device, a server or an external device. Or, the electronic device may execute a gallery application to acquire the image 100 stored in the gallery application. Or, the electronic device may access a social network server, a cloud server, a content providing server, etc. to download the image 100.

According to an embodiment, the electronic device may match the image 100 with images that are accessible by the electronic device to determine images 110, 120, 130, and 140 including a same and/or similar object to the object 150 included in the image 100.

The images that are accessible by the electronic device may include at least one among images stored in advance in the electronic device, images that can be received from an external device communicating with the electronic device, and images that can be received from a server.

According to an embodiment, the images that are accessible by the electronic device may be constituted with image groups each grouped for a same object, and the electronic device may determine an image group corresponding to the detected object 150. For example, a first image group 180 may include images 110 and 120 obtained by photographing XX ramen, and a second image group 190 may include images 130 and 140 obtained by photographing OO ramen. According to an embodiment, the electronic device may determine a plurality of image groups corresponding to the object 150, and determine image groups corresponding to a predetermined direction or location of the image 100 from among the determined image groups. For example, the electronic device may determine that a left side of the object 150 corresponds to the first image group 180 and a right side of the object 250 corresponds to the second image group 190.

According to an embodiment, the electronic device may estimate front directions of objects included in the image groups determined from the image 100, based on photographing conditions of the determined image groups and a photographing condition of the image 100.

A front direction of an object is a direction set to a three-dimensional vector indicating an arbitrary direction from the center of the object, and may be set to a direction of a straight line that is perpendicular to a front side of the object. According to an embodiment, a front direction of an object may be a direction that is opposite to a photographing direction of a representative image included in an image group. For example, a front direction of an object may be a vector toward a focus position of a photographing camera from the center of the object. For example, a front direction of the XX ramen of the first image group 180 may be an opposite direction of a photographing direction of a representative image 110 of the first image group 180. According to an embodiment, a front direction of an object of an image group may be stored as information of the image group together with images.

The photographing condition may include at least one of a photographing position and a photographing direction. According to an embodiment, the electronic device may estimate a front direction of an object included in the first image group 180 from the image 100, according to a relative difference between the photographing conditions of the images 110 and 120 included in the first image group 180 and the photographing condition of the image 100. For example, a front direction of the XX ramen in the image 100 may be estimated as a left direction of the object 150. According to an embodiment, the electronic device may estimate a front direction of an object of the second image group 190 from the image 100, according to a relative difference between the photographing conditions of the images 130 and 140 included in the second image group 190 and the photographing condition of the image 100. For example, a front direction of the OO ramen in the image 100 may be estimated as a right direction of the object 150.

According to an embodiment, the electronic device may output information of the image group in the estimated front direction of the object. For example, the electronic device may output information of the image group in the front direction of the object 150, at a location that is close to the object 150.

The information of the image group may include, as common information of images included in the image group, a name of the object included in the image group, an address of a site for purchasing the object, ID information of the image group, etc. For example, images having a same ID may be grouped into an image group.

According to an embodiment, the electronic device may output information of the image groups in the estimated front directions of the object. For example, the information of the image groups may be used as information representing recognition results of the object 150. For example, in the left direction of the object 150 estimated as a front direction of the corresponding object in the first image group 180, the electronic device may display a name 160 of the object of the first image group 180. Also, for example, in the right direction of the object 150 estimated as a front direction of the corresponding object in the second image group 190, the electronic device may display a name 170 of the object of the second image group 190.

The electronic device may be a smart phone, a tablet PC, a PC, a smart TV, a mobile phone, personal digital assistant (PDA), a laptop, a media player, a micro server, a global positioning system (GPS) device, an e-book terminal, a terminal for digital broadcasting, a navigation, a kiosk, a MP3 player, a digital camera, a home appliance, or another mobile or non-mobile computing device, although not limited thereto. Also, the electronic device may be a wearable device, such as a watch, glasses, a hair band, and a ring, including a communication function and a data processing function, although not limited thereto. Also, the electronic device may include all kinds of devices capable of providing recognition results of an object.

Also, the electronic device may communicate with a server and another device (not shown) through a predetermined network to provide a recognition result of an object by using various images that are accessible by the electronic device. In this case, the network may include a Local Area Network (LAN), a Wide Area Network (WAN), a Value Added Network (VAN), a mobile radio communication network, a satellite communication network, and a combination thereof. The network may be a data communication network of a comprehensive meaning, which enables stable communications between components configuring the network, and may include the wired Internet, the wireless Internet, and a mobile wireless communication network. The wireless communication may be, for example, a wireless LAN (Wi-Fi), Bluetooth Low Energy (BLE), Zigbee, Wi-Fi Direct (WFD), Ultra Wideband (UWB), Infrared Data Association (IDA), Near Field Communication (NFC), etc., although not limited thereto.

Figure 2:
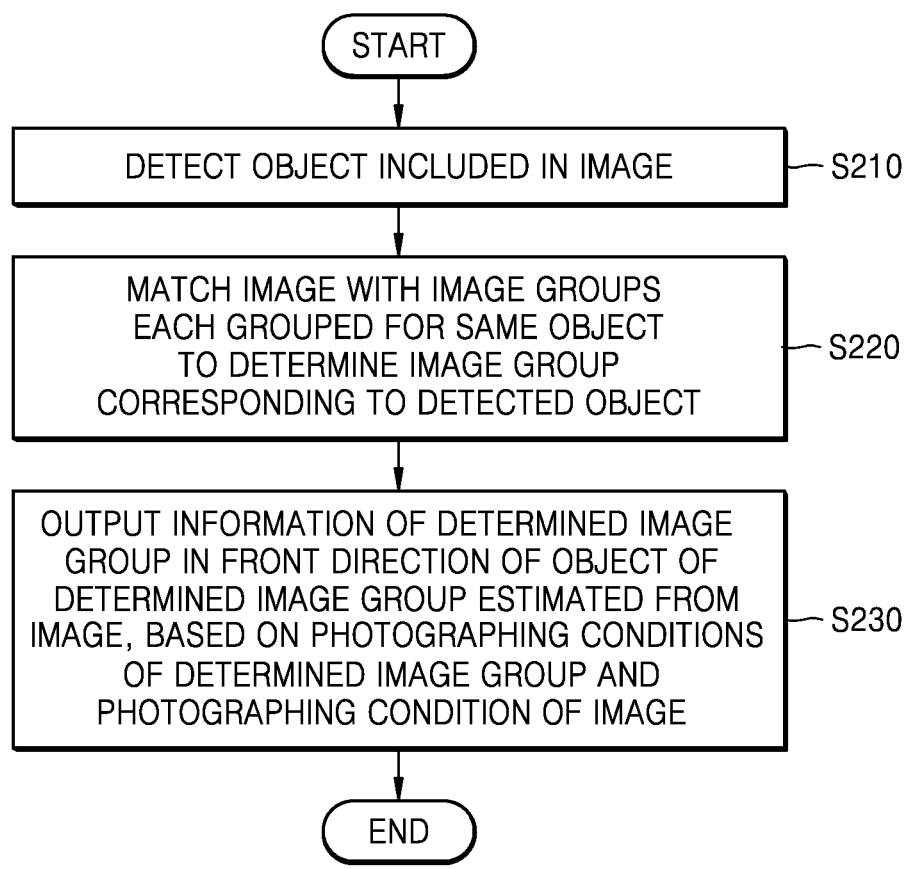
FIG. 2 is a flowchart showing a method of providing a recognition result of an object, performed by an electronic device, according to an embodiment.

FIG. 2 is a flowchart showing a method for, performed by an electronic device, providing a recognition result of an object, according to an embodiment.

In operation S210, the electronic device may detect an object included in an image.

According to an embodiment, the electronic device may detect an object included in an image by using images stored in advance. Also, images that are used to detect the object may be determined according to learning by predetermined criterion. For example, supervised learning of using predetermined images as input values or unsupervised learning of itself learning the kinds of images required for detecting an object without being supervised to find a pattern for detecting the object may be used to detect the object. Also, for example, reinforcement learning of using a feedback informing whether a detection result of an object according to learning is correct may be used to detect the object included in the image.

According to an embodiment, the electronic device may detect objects included in the image from the image, based on results of learning using a data recognition model. A neural network may be a group of algorithms for extracting various attributes included in an image by using results of statistical machine learning and using the attributes to identify and/or determine objects included in the image. For example, the electronic device may input an image to a data recognition model, and receive locations of objects included in the image from the data recognition model.

In operation S220, the electronic device may match the image with image groups each grouped for a same object to determine an image group corresponding to the detected object.

According to an embodiment, the electronic device may determine a first similarity between the image including the detected object and each of images included in the image groups. For example, to determine the first similarity between the images, the electronic device may learn criterion for determining the first similarity between the images. An example of determining the first similarity between the images through learning will be described with reference to FIGS. 6 to 11, later. Or, the electronic device may use geometric verification to determine the first similarity between the images. An example of determining a first similarity between images through geometric verification will be described with reference to FIG. 3, later.

According to an embodiment, the electronic device may determine second similarities between the image and the image groups, based on the first similarities and photographing conditions of the image estimated from the images included in the image groups. For example, to calculate the second similarities, the electronic device may multiply the first similarities by a weight based on a difference between the estimated photographing conditions of the image to sum results of the multiplying. Equation for calculating the second similarities will be described with reference to FIG. 4, later. For example, the electronic device may determine an image group having a second similarity that is greater than or equal to a threshold value, as an image group corresponding to the detected object.

The threshold value may have been set in advance in the electronic device, and the threshold value may be set to a great value for providing more accurate recognition results of a small number of objects. Also, for example, the threshold value may be reset by a user of the electronic device.

In operation S230, the electronic device may output information of the determined image group, in a front direction of the corresponding object of the determined image group, estimated from the image, based on the photographing conditions of the determined image group and the photographing conditions of the image.

According to an embodiment, the electronic device may match the image with a representative image of the determined image group to estimate a photographing condition of the image from a photographing condition of the representative image. For example, the representative image of the image group may be a front-view image of an object included in common in the images of the image group. For example, the images in the image group may store photographing positions and photographing directions obtained through geometric verification between the images. Also, for example, because the electronic device knows all the relative photographing positions and photographing directions of the images in the image group, the electronic device may match the image with an arbitrary image in the image group to estimate a photographing condition of the image from the photographing condition of the arbitrary image in the image group.

According to an embodiment, the electronic device may estimate a front direction of the object in the image from a predetermined front direction of the corresponding object in the image group, based on the estimated photographing condition. For example, the front direction of the object in the image group may be a photographing direction of the representative image. Also, the front direction of the object in the image group, estimated from the image, may be a direction resulting from correcting a front direction of the object in the representative image to correspond to the image, according to a photographing position and a photographing direction of the image, estimated from the representative image.

According to an embodiment, the electronic device may display a graphic user interface (GUI) representing the information of the determined image group in the estimated front direction of the object. For example, the electronic device may overlap a virtual GUI representing the information of the determined image group on a real image being captured to provide Augmented Reality (AR).

According to an embodiment, the electronic device may further perform an operation of receiving a user input of selecting the displayed GUI. For example, the electronic device may receive a user's touch input of touching the displayed GUI. According to an embodiment, the touch input means a gesture, etc. made on a touch screen by the user for controlling the electronic device. For example, the touch input described in this specification may include tap, touch & hold, double tap, drag, panning, flick, drag & drop, etc.

Also, according to an embodiment, the electronic device may further perform an operation of accessing a site for purchasing the object of the image group based on the information of the image group. For example, the information of the image group may include a Uniform Resource Locator (URL) at which information required for purchasing the object of the image group exists, and the electronic device may browse the URL.

According to an embodiment, the electronic device may track the detected object or a movement of the camera to change a location and direction of the information of the image group according to the movement of the camera. For example, the electronic device may track a movement of the camera capturing an image. Also, for example, the electronic device may output information of the image group in the front direction of the object in the determined image group, estimated from the image, based on an image photographing condition changed according to the photographing condition of the determined image group and the movement of the camera.

Meanwhile, according to an embodiment, when the image is a depth image captured by a depth camera, the electronic device may match the depth image with three-dimensional models of a plurality of objects to determine a three-dimensional model corresponding to an object detected from the depth image. For example, when the three-dimensional models are stored in the electronic device, a server or an external device, and the electronic device is accessible to the three-dimensional models, the electronic device may determine similarities between the depth image and the three-dimensional models by using depth information of the depth image. Also, the electronic device may determine a three-dimensional model having a similarity that is greater than or equal to a threshold value as a three-dimensional model corresponding to the object detected from the depth image. The depth information means information representing a depth of a predetermined object in the image.

Also, according to an embodiment, the electronic device may output information of the three-dimensional model in a front direction of the object of the three-dimensional model in the depth image, based on the depth information of the depth image. For example, the front direction of the object of the three-dimensional model may be set to a three-dimensional vector indicating an arbitrary direction from the center of the object in the three-dimensional model, and may be set to a direction of a straight line that is perpendicular to a front side of the object. Also, according to an embodiment, the electronic device may match the depth image with the determined three-dimensional model to output information of the three-dimensional model in the front direction of the object of the three-dimensional model in the depth image. For example, the information of the three-dimensional model may be a concept corresponding to the information of the image group described above, and include a name of the object represented by the three-dimensional model, an address of a site for purchasing the object, etc.

Figure 3:
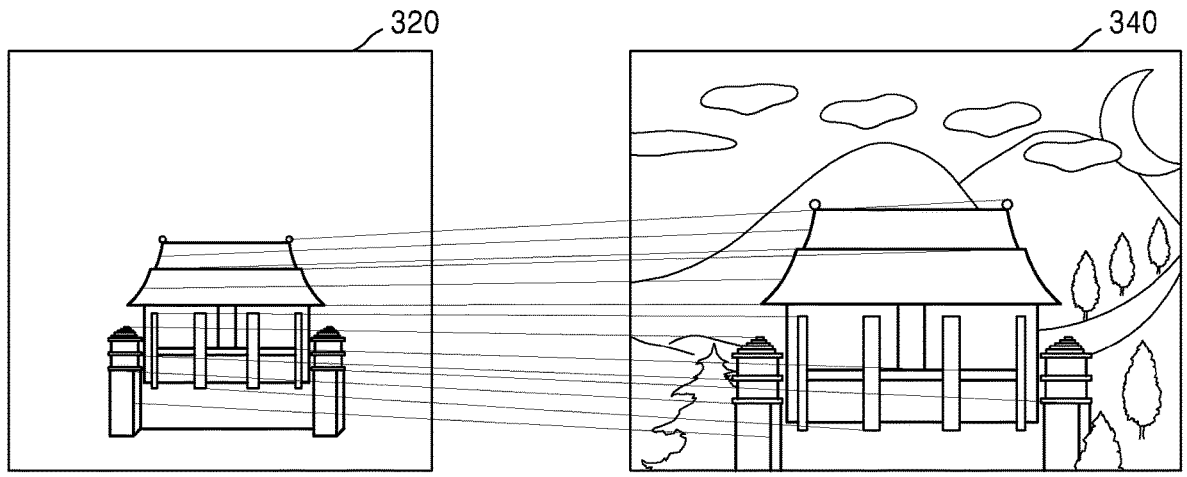
FIG. 3 shows an example of determining a similarity between images, according to an embodiment.
Figure 3:
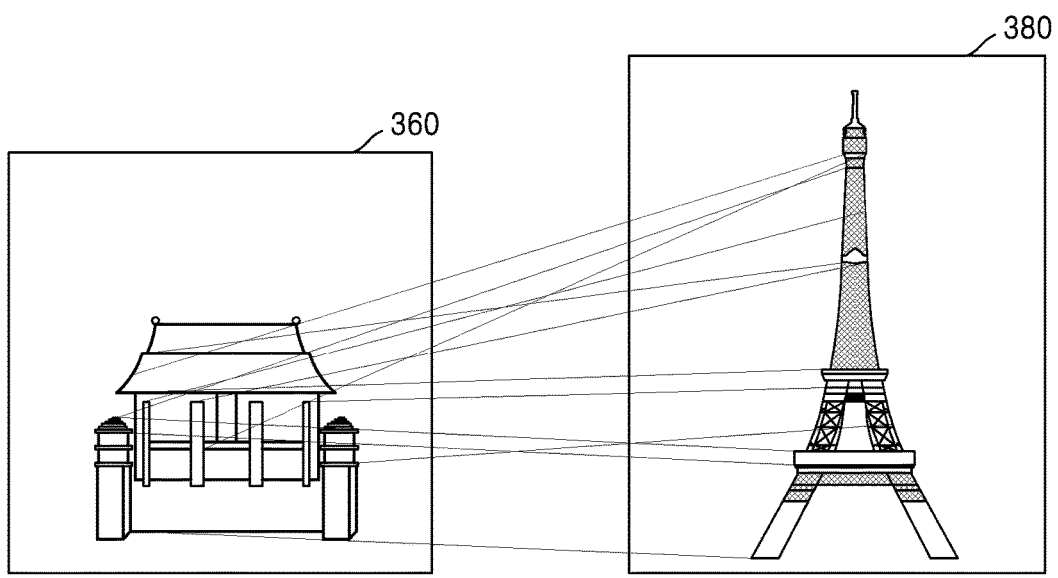

FIG. 3 shows an example of determining a similarity between images, according to an embodiment.

According to an embodiment, the electronic device may use geometric verification to determine similarities between an image from which a recognition result of an object will be provided and images stored in advance.

The geometric verification may be a method used for image registration, etc. The geometric verification may be a technique for extracting feature points in a plurality of images to match the feature points with each other, and then calculating degrees of correspondence to three-dimensional transformation to thus determine whether objects included in the individual images are a same object.

The image registration is a processing technique for transforming, when a scene or object is photographed at different times or at different viewpoints, images acquired from different coordinate systems to represent the images on a same coordinate system.

According to an embodiment, the electronic device may determine a similarity between a first image 320 and a second image 340 through geometric verification. For example, the electronic device may determine a similarity between an object included in the first image 320 and an object included in the second image 340 through geometric verification. For example, the electronic device may extract feature points of the first image 320 and the second image 340, and match the extracted feature points with each other to determine a similarity between the first image 320 and the second image 340 or between an object included in the first image 320 and an object included in the second image 340.

According to an embodiment, the feature points may be two-dimensional coordinates on the images. The electronic device may extract feature expression value vectors representing characteristics of the images from predetermined areas with the feature points as the centers, and when a similarity between the feature expression value vectors is greater than or equal to a predetermined value, the electronic device may determine that the feature points match with each other. According to an embodiment, when the electronic device determines that the feature points match with each other, the electronic device may determine that the images are similar to each other. For example, when the number of feature points matching between the first image 320 and the second image 340 is greater than or equal to a predetermined value, the electronic device may determine that the first image 320 is similar to the second image 340.

According to an embodiment, the electronic device may determine a similarity between a third image 360 and a fourth image 380 through geometric verification. For example, the electronic device may determine a similarity between an object included in the third image 360 and an object included in the fourth image 380, through geometric verification. For example, the electronic device may extract feature points of the third image 360 and the fourth image 380, and match the extracted feature points with each other to determine a similarity between the third image 360 and the fourth image 380 or between an object included in the third image 360 and an object included in the fourth image 380. For example, when the number of feature points matching between the third image 360 and the fourth image 380 is smaller than or equal to a predetermined value, the electronic device may determine that the third image 360 is not similar to the fourth image 380.

Also, the electronic device may estimate a relative photographing position and a relative photographing direction of an image from which a recognition result of an object will be provided, with respect to images stored in advance, through geometric verification. According to an embodiment, a photographing position and a photographing direction of the second image 340 may have been stored in advance in the electronic device or a server. For example, the electronic device may find pairs of matching feature points through geometric verification between the first image 320 and the second image 340, and estimate a relative photographing position and a relative photographing direction of the first image 320 with respect to a photographing position and a photographing direction of the second image 340 from the matching feature points included in the first image 320 and the matching feature points included in the second image 340. For example, the electronic device may select only pairs of feature points corresponding to changes in photographing condition between the first image 320 and the second image 340 from among the matching feature points, and determine a similarity between the objects included in the first image 320 and the second image 340 or a similarity between the first image 320 and the second image 340 based on the number of the selected pairs of feature points.

Figure 4:
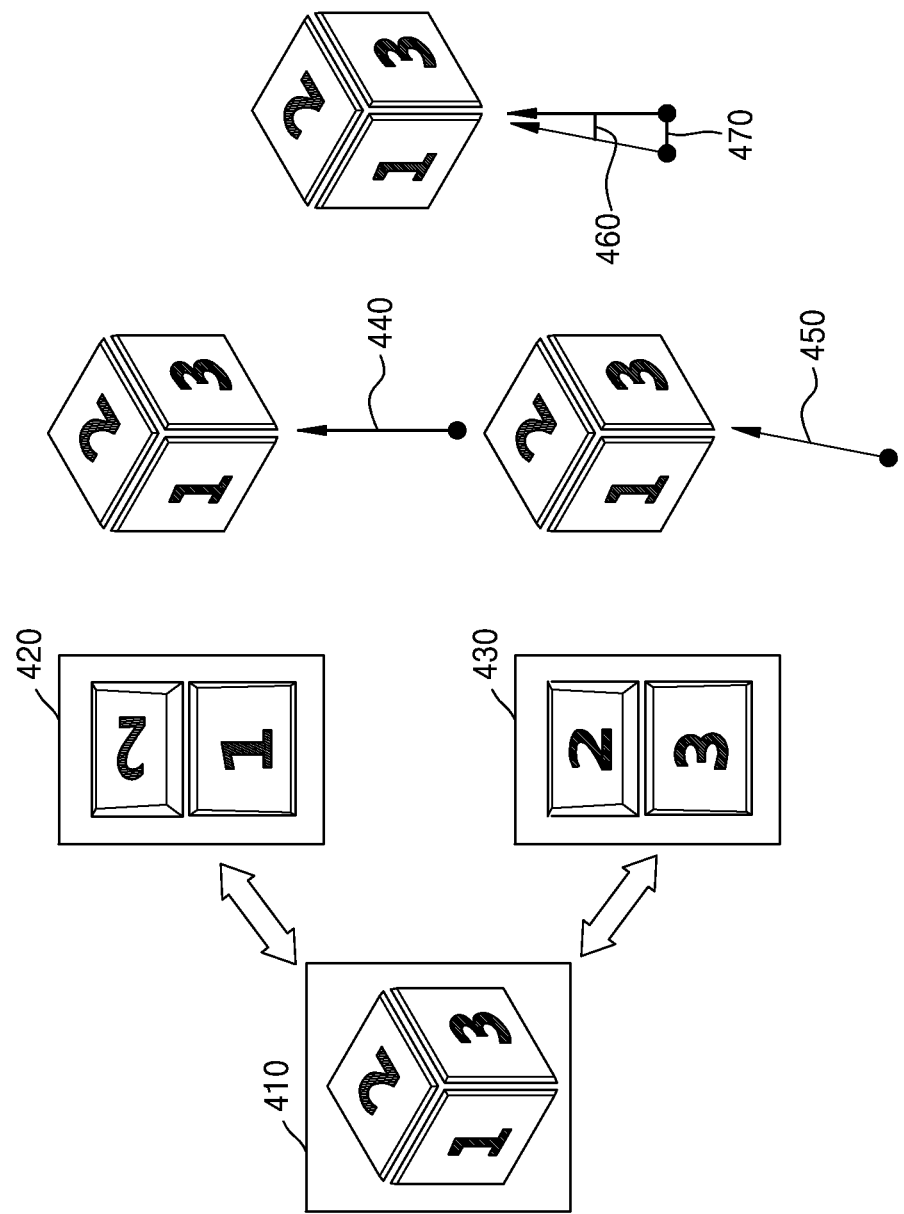
FIG. 4 shows an example of estimating a front direction of an object, according to an embodiment.

FIG. 4 shows an example of determining a similarity between an image and an image group, according to an embodiment.

According to an embodiment, the electronic device may determine a second similarity between an image and an image group, based on first similarities between the image and images included in the image group and photographing conditions of the image estimated from the images included in the image group. For example, the electronic device may multiply the first similarities by a weight based on a difference between the estimated photographing conditions of the image to sum results of the multiplying, thereby calculating the second similarity. By determining the second similarity between the image and the image group, as well as the first similarities between the images, the electronic device may more accurately search an image corresponding to the detected object in consideration of the plurality of similarities and photographing conditions.

For example, a first image 410 may be an image from which a recognition result of an object will be provided by the electronic device, and a second image 420 and a third image 430 may be images having a same ID and grouped into an image group.

According to an embodiment, a second similarity between the first image 410 and the image group including the second image 420 and the third image 430 may be calculated by Equation (1) below:

$$Z = X + \frac{Y}{1 + a \times M^2 + b \times N^2}. \quad (1)$$

Herein, X represents the first similarity between the first image 410 and the second image 420, Y represents the first similarity between the first image 410 and the third image 430, and Z represents the second similarity between the first image 410 and the image group including the second image 420 and the third image 430. Also, M represents a difference 470 between the photographing positions of the first image 410 estimated from the second image 420 and the third image 430. N represents a difference 460 between the photographing directions of the first image 410 estimated from the second image 420 and the third image 430.

In Equation (1) for calculating the second similarity according to an embodiment, a is a coefficient of M square, b is a coefficient of N square, and a and b are predetermined values that may be a same value or different values. For example, when a and b are different values, different weights may be assigned to the difference 470 between the photographing positions and the difference 460 between the photographing directions. Also, for example, a and b may be arbitrary real numbers.

For example, the first similarity between the first image 410 and the second image 420 may be 62%, and the first similarity between the first image 410 and the third image 430 may be 58%. In this case, the electronic device may combine the first similarity between the first image 410 and the second image 420 with the first similarity between the first image 410 and the third image 430 to calculate the second similarity between the first image 410 and the image group including the second image 420 and the third image 430.

For example, the electronic device may estimate a photographing position and a photographing direction of the first image 410 based on a photographing position and a photographing direction of the second image 420 stored in advance. Also, the electronic device may estimate a photographing position and a photographing direction of the first image 410 based on a photographing position and a photographing direction of the third image 430 stored in advance. For example, the photographing position and the photographing direction of the first image 410 estimated from the second image 420 may be an end point of an arrow 440 and a direction indicated by the arrow 440, and the photographing position and the photographing direction of the first image 410 estimated from the third image 430 may be an end point of an arrow 450 and a direction indicated by the arrow 450. For example, the electronic device may estimate that the first image 410 is an image captured at a position moved to the left by 45 degrees from a position at which the second image 420 has been captured and that the first image 410 is an image captured at a position moved to the right by 45 degrees from a position at which the third image 430 has been photographed, through geometric verification.

According to an embodiment, the electronic device may calculate the difference 470 between the photographing position of the first image 410 estimated from the second image 420 and the photographing position of the first image 410 estimated from the third image 430. Also, according to an embodiment, the electronic device may calculate the difference 460 between the photographing direction of the first image 410 estimated from the second image 420 and the photographing direction of the first image 410 estimated from the third image 430.

According to an embodiment, the electronic device may apply a weight to the first similarities, based on the difference between the estimated photographing positions of the first image 410 and the difference between the estimated photographing directions of the first image 410. For example, it is assumed that a is 1, b is 0, and M is 1 in Equation (1). In this case, the electronic device may add 62% being the first similarity between the first image 410 and the second image 420 to a value obtained by multiplying 58% being the first similarity between the first image 410 and the third image 430 by a weight, thereby calculating the second similarity (62%+52%/(1+1*1$^2$)=88%) between the first image 410 and the image group including the second image 420 and the third image 430.

Figure 5:
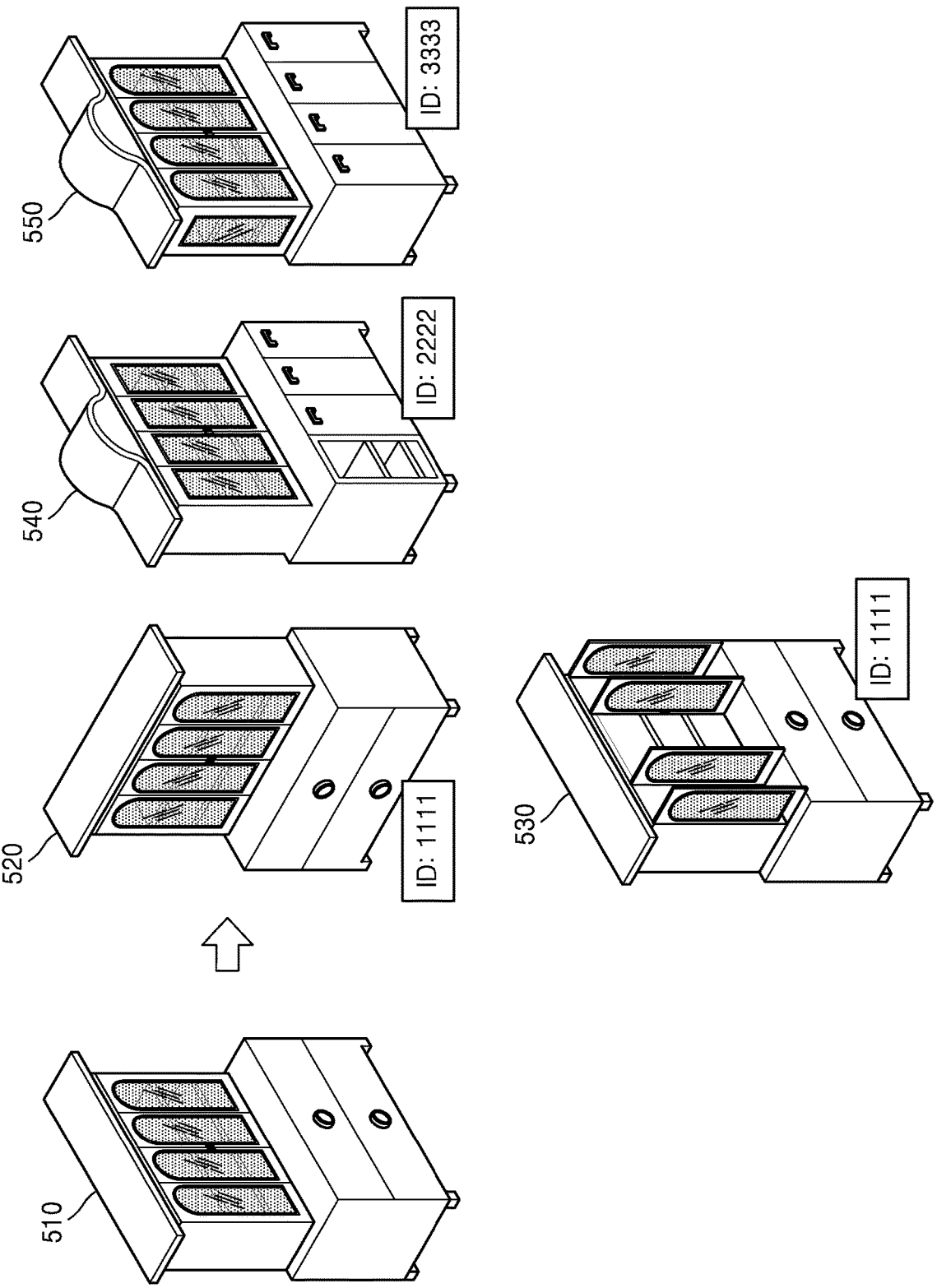
FIG. 5 shows an example of determining similarities between an image and image groups, according to an embodiment.

FIG. 5 shows an example of determining similarities between objects, according to an embodiment.

According to an embodiment, the electronic device may match a first image 510 with images stored in database to provide a recognition result of the first image 510. Also, according to an embodiment, the electronic device may acquire a second image 520, a third image 530, a fourth image 540, and a fifth image 550 that are similar to the first image 510, through matching. For example, the second image 520 and the third image 530 may be images included in a same image group. According to an embodiment, the electronic device may match the first image 510 with the second image 520, the third image 530, the fourth image 540, and the fifth image 550 to determine that the first image 510 is more similar to the fourth image 540 and the fifth image 550 than the second image 520 and the third image 530.

However, although the electronic device determines that a certain image is determined as an image having a low similarity through matching between images, the electronic device may sum similarities of a plurality of images in the same image group to more accurately determine an image that is similar to an image from which a recognition result of an object will be provided. For example, the electronic device may apply different weights to a similarity between the first image 510 and the second image 520 and a similarity between the first image 510 and the second image 530, and sum results of the multiplying, according to Equation described above with reference to FIG. 4, thereby calculating a similarity between the first object 510 and a group having an ID of 1111. For example, unlike the matching between the images, the electronic device may determine that a similarity of the group having the ID of 1111 is higher than those of a group having an ID of 2222 and a group having an ID of 3333. As in the above-described embodiment, the electronic device may combine similarities between a plurality of images, thereby improving the performance of image searching.

Figure 6:
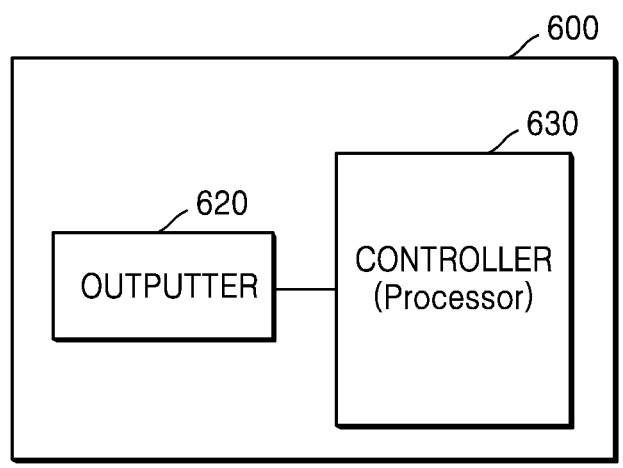
FIGS. 6 and 7 are block diagrams showing a configuration of an electronic device according to some embodiments.
Figure 7:
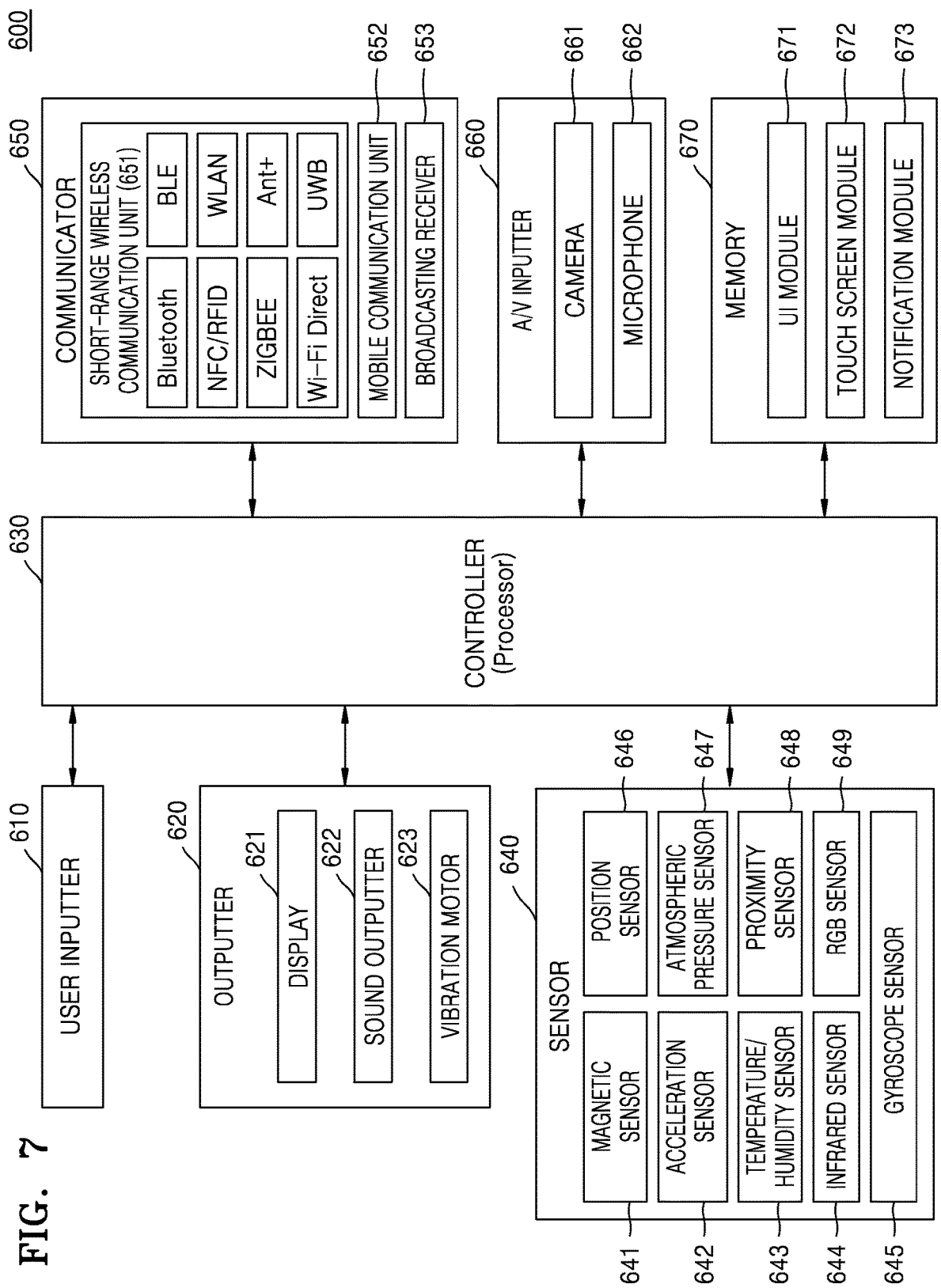

FIGS. 6 and 7 are block diagrams showing a configuration of an electronic device according to some embodiments.

As shown in FIG. 6, the electronic device 600 may include an outputter 620 and a controller 630. However, the components shown in FIG. 6 are not essential components of the electronic device 600. The electronic device 600 may be implemented with more or less components than those shown in FIG. 6.

For example, as shown in FIG. 7, the electronic device 600 according to an embodiment may further include a user inputter 610, a sensor 640, a communication unit 650, an Audio/Video (A/V) inputter 660, and a memory 670, in addition to the outputter 620 and the controller 630.

The user inputter 610 may be means to enable a user to input data for controlling the electronic device 600. For example, the user inputter 610 may be a key pad, a dome switch, a touch pad (a capacitive type, a resistive type, an infrared beam type, a surface acoustic wave type, an integral strain gauge type, a piezo effect type, etc.), a jog wheel, a jog switch, etc., although not limited thereto.

The user inputter 610 may receive a user input. For example, the user inputter 100 may receive a user input for acquiring an image, a user input for executing an application, etc. Also, the user inputter 610 may receive a user input of selecting a graphic user interface from among at least one graphic user interface displayed.

The outputter 620 may output audio signals, video signals, or vibration signals, and include a display 621, a sound outputter 622, a vibration motor 623, etc.

The display 621 may be controlled by the controller 630 which will be described later to display information that is processed by the electronic device 600. The display 621 may display at least one image. For example, the display 621 may display Augmented Reality (AR) including a virtual object, together with at least one image.

Meanwhile, when the display 621 and a touch pad form a layer structure to be configured as a touch screen, the display 621 may be used as an inputter, as well as an outputter. The display 621 may include at least one among a liquid crystal display, a thin film transistor-liquid crystal display, a thin film transistor-liquid crystal display, an organic light-emitting diode, a flexible display, a 3D display, and an electrophoretic display. According to an implementation form of the electronic device 600, the electronic device 600 may include two or more displays 621. The two or more displays 621 may be arranged to face each other by using a hinge.

The sound outputter 622 may output audio data that is received from the communication unit 650 or stored in the memory 670. Also, the sound outputter 622 may output a sound signal related to a function (e.g., call signal ringtone, message ringtone, and notification sound) that is performed in the electronic device 600. The sound outputter 622 may include a speaker, a buzzer, etc.

The vibration motor 623 may output vibration signals. For example, the vibration motor 623 may output vibration signals corresponding to outputs of audio data or video data (for example, call signal reception sound, message reception sound, etc.). Also, the vibration motor 623 may output a vibration signal when a touch is input to the touch screen.

The controller 630 may control all operations of the electronic device 600. The controller 630 may include at least one processor. The controller 630 may include a plurality of processors or an integrated processor, according to its functions or roles.

For example, the controller 630 may execute programs stored in the memory 670 to control the user inputter 610, the outputter 620, the sensor 640, the communication unit 650, the A/V inputter 660, etc. Also, the controller 630 may control the user inputter 610, the outputter 620, the sensor 640, the communication unit 650, and the A/V inputter 660 such that the electronic device 600 provides a recognition result of at least one object.

More specifically, the controller 630 may execute a computer-executable instruction to detect an object included in an image, to determine an image group corresponding to the detected object through matching between an image and image groups each grouped for a same object, and to estimate a front direction of the determined image group from the image, based on a photographing condition of the determined image group and a photographing condition of the image. For example, the controller 630 may execute a computer-executable instruction to estimate a photographing condition of the image from a photographing condition of a representative image of the determined image group through matching between the image and the representative image of the determined image group and to estimate a front direction of the object of the representative image in the image from a front direction of the object in the predetermined representative image, based on the estimated photographing condition of the image. Also, the controller 630 may access a site for purchasing the object of the image group based on information of the image group, in response to a user input of selecting a displayed graphic user interface.

Also, the controller 630 according to an embodiment may execute a computer-executable instruction to determine first similarities between the image and images of the image groups, to determine second similarities between the image and the image groups based on the first similarities and photographing conditions of the image estimated from the images of the image groups, and to determine an image group having a second similarity that is greater than or equal to a threshold value, as an image group corresponding to the detected object. For example, the controller 630 may multiply the first similarities by a weight based on a difference between the estimated photographing conditions of the image to sum results of the multiplying. Also, for example, the controller 630 may learn criterion for determining the first similarities.

Also, the controller 630 according to an embodiment may execute a computer-executable instruction to estimate a front direction of the object of the determined image group in the image, based on a photographing condition of the image group and a photographing condition of the image, changed according to a movement of the camera sensed by the sensor 640.

Also, the controller 630 may control the communication unit 650 to transmit/receive an image that is accessible by the electronic device to/from an external device and a server.

The sensor 640 may sense a state of the electronic device 600 or a state of surroundings of the electronic device 600, and transfer the sensed information to the controller 630.

The sensor 640 may include at least one among a magnetic sensor 641, an acceleration sensor 642, a temperature/humidity sensor 643, an infrared sensor 644, a gyroscope sensor 645, a position sensor (e.g., GPS) 646, an atmospheric pressure sensor 647, a proximity sensor 648, and a RGB sensor 649, although not limited thereto. Functions of the individual sensors are intuitively inferred by one of ordinary skill in the art from their names, and therefore, detailed descriptions thereof will be omitted.

The communication unit 650 may include one or more components for enabling the electronic device 600 to communicate with another device (not shown) and a server (not shown). For example, the communication unit 650 may include a short-range wireless communication unit 651, a mobile communication unit 652, and a broadcasting receiver 653.

The short-range wireless communication unit 651 may include a Bluetooth communication unit, a Bluetooth Low Energy (BLE) communication unit, a Near-Field Communication (NFC) unit, a Wireless Local Access Network (WLAN: Wi-Fi) communication unit, a Zigbee communication unit, an Infrared Data Association (IrDA) communication unit, a Wi-Fi Direct (WFD) communication unit, a Ultra Wideband (UWB) communication module, and an Ant+ communication unit, although not limited thereto.

The mobile communication unit 652 may transmit/receive a wireless signal to/from at least one of a base station, an external terminal, and a server on a mobile communication network. Herein, the wireless signal may include a voice call signal, a video call signal or various formats of data according to transmission/reception of text/multimedia messages.

The broadcasting receiver 653 may receive a broadcasting signal and/or broadcasting-related information from the outside through a broadcasting channel. The broadcasting channel may include a satellite channel and a terrestrial channel. According to implementation examples, the electronic device 600 may not include the broadcasting receiver 653.

The communication unit 650 may be controlled by the controller 630 to transmit/receive data to/from an external device and a server. The communication unit 650 may transmit data to another electronic device directly or via a server. Also, the communication unit 650 may receive data from another electronic device directly or via a server.

The A/V inputter 660 may be used for input of an audio signal or a video signal, and may include the camera 661 and the microphone 662. The camera 661 may acquire an image frame, such as a still image or a moving image, through an image sensor in a video call mode or a photographing mode. An image captured by the image sensor may be processed by the controller 630 or a separate image processor (not shown).

An image frame processed by the camera 661 may be stored in the memory 670 or transmitted to the outside through the communication unit 650. Two or more cameras 661 may be provided according to a configuration aspect of a terminal. Also, for example, the camera 661 may include a depth camera.

The microphone 662 may receive a sound signal from the outside and process the sound signal into electrical voice data. For example, the microphone 662 may receive a sound signal from an external device or a speaker. The microphone 662 may use various noise removal algorithms to remove noise generated upon receiving a sound signal from the outside.

The memory 670 may store a program for processing and control of the controller 630, and store input/output data (for example, text, text-related images, results selected by a user from among the test-related images, etc.). The memory 670 may store computer-executable instructions.

The memory 670 may include at least one type of storage medium among a flash memory type, a hard disk type, a multimedia card micro type, a card type memory (e.g., SD or XD memory), Random Access Memory (RAM), Static Random Access Memory (SRAM), Read Only Memory (ROM), Electrically Erasable Programmable Read-Only Memory (EEPROM), Programmable Read-Only Memory (PROM), a magnetic memory, a magnetic disk, and an optical disk. Also, the electronic device 600 may operate a web storage or a cloud server that performs a storage function of the memory 670 on the Internet.

Programs stored in the memory 670 may be classified into a plurality of modules according to their functions, and for example, the programs may be classified into a UI module 671, a touch screen module 672, etc.

The UI module 671 may provide a specialized UI or GUI interworking with the electronic device 600 for each application. The touch screen module 672 may sense a user's touch gesture made on a touch screen, and transfer information about the user's touch gesture to the controller 630. The touch screen module 672 according to an embodiment may recognize and analyse a touch code. The touch screen module 672 may be configured with separate hardware including a controller.

Various sensors may be installed in the inside of the touch screen or around the touch screen to sense a touch or proximity touch made on the touch screen. An example of a sensor for sensing a touch made on the touch screen is a tactile sensor. The tactile sensor may be a sensor for sensing a contact of a predetermined object, which may be felt by a human. The tactile sensor may be a sensor for sensing a predetermined object's contact that may be felt by a human.

The tactile sensor may sense various information, such as roughness of a contact surface, stiffness of a contact object, temperature of a contact point, etc.

An example of the sensor for sensing a touch made on the touch screen is a proximity sensor.

The proximity sensor may be a sensor for determining whether there is an object approaching a predetermined detection surface or an object existing around the predetermined detection surface by using a force of an electromagnetic field or infrared light without receiving any mechanical contact. Examples of the proximity sensor are a transmitting photoelectric sensor, a diffused-reflection type photoelectric sensor, a mirror reflection type photoelectric sensor, a high-frequency oscillation type proximity sensor, a capacitive proximity sensor, a magnetic proximity sensor, an infrared proximity sensor, etc.

The notification module 673 may generate a signal for informing event occurrence of the electronic device 600. Examples of events that are generated in the electronic device 600 may be call signal reception, message reception, a key signal input, schedule notification, etc. The notification module 673 may output a notification signal in the form of a video signal through the display 621, in the form of an audio signal through the sound outputter 622, or in the form of a vibration signal through the vibration motor 623.

Meanwhile, the configuration of the electronic device 600 shown in FIGS. 6 and 7 may be an embodiment. Some components of the electronic device 600 may be integrated into one component or omitted, or other components may be added to the electronic device 600, according to a specification of the electronic device 600. That is, two or more components may be integrated into one component or one component may be subdivided into two or more components, as necessary. Also, a function that is performed in each component (or each module) is provided to describe embodiments, and detailed operations or apparatuses therefor do not limit the scope of right of the present disclosure.

Figure 8:
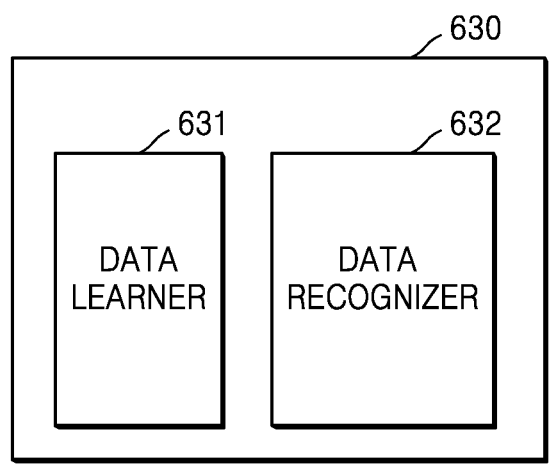
FIG. 8 is a block diagram illustrating in detail a controller according to an embodiment.

FIG. 8 is a block diagram detailedly showing the controller 630 according to an embodiment.

Referring to FIG. 8, the controller 630 according to an embodiment may include a data learner 631 and a data recognizer 632.

The data learner 631 may learn criterion for determining a similarity between images. The data learner 631 may learn criterion related to what data will be used to determine a predetermined similarity and how to determine a similarity using data. The data learner 631 may acquire data that is to be used for learning, and apply the acquired data to a data recognition model which will be described later, thereby learning criterion for determining a similarity.

The data recognizer 632 may determine a similarity between at least two or more images. Also, for example, a determination on a similarity between at least two or more images may include a determination on a similarity between at least two or more objects. The data recognizer 632 may determine a similarity between at least two or more objects by using a learned data recognition model. The data recognizer 632 may analyse a characteristic of each object according to predetermined criterion by learning, and apply a data recognition model of using the analysed data as an input value to thereby determine a similarity between at least two or more objects. Also, a result value output by the data recognition model of using the analysed data as an input value may be used to refine the data recognition model.

At least one of the data learner 631 and the data recognizer 632 may be manufactured in the form of at least one hardware chip and mounted on the electronic device. For example, at least one of the data learner 631 and the data recognizer 632 may be manufactured in the form of a dedicated hardware chip for artificial Intelligence (AI) or as a part of a typical general-purpose processor (e.g., CPU or application processor) or a graphic dedicated processor (e.g., GPU) and mounted on various electronic devices as described above.

In this case, the data learner 631 and the data recognizer 632 may be mounted on a single electronic device or on different electronic devices. For example, one of the data learner 631 and the data recognizer 632 may be included in the electronic device and the other one may be included in a server. Also, the data learner 631 and the data recognizer 632 may provide model information constructed by itself to the data recognizer 632 in a wired or wireless manner, and also, data input to the data recognizer 632 may be provided as additional training data to the data learner 631.

Meanwhile, at least one of the data learner 631 and the data recognizer 632 may be implemented as a software module. When at least one of the data learner 631 and the data recognizer 632 is implemented as a software module (or, a program module including an instruction), the software module may be stored in non-transitory computer readable media. Also, in this case, the at least one software module may be provided by Operating System (OS) or by a predetermined application. Or, a part of the at least one software module may be provided by OS and the other part may be provided by the predetermined application.

Figure 9:
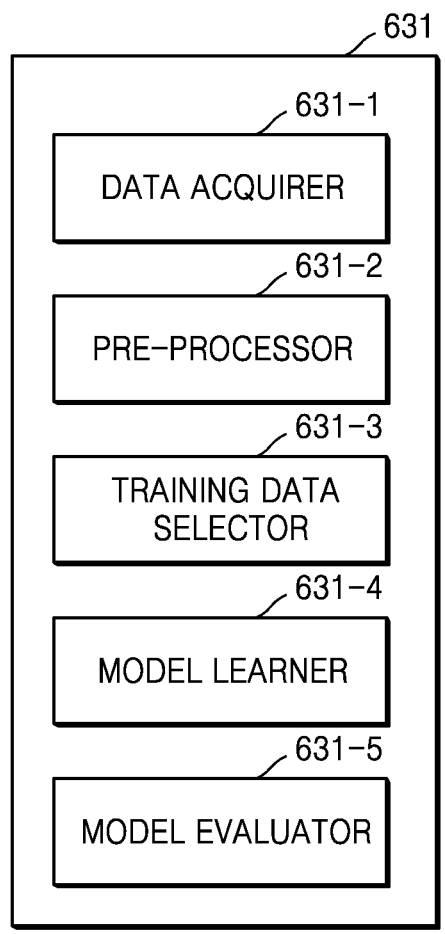
FIG. 9 is a block diagram illustrating in detail a data learner according to an embodiment.

FIG. 9 is a block diagram detailedly showing the data learner 631 according to an embodiment.

Referring to FIG. 9, the data learner 631 according to an embodiment may include a data acquirer 631-1, a pre-processor 631-2, a training data selector 631-3, a model learner 631-4, and a model evaluator 631-5.

The data acquirer 631-1 may acquire data required to determine a similarity between images. The data acquirer 631-1 may acquire data required for learning to determine a similarity between images.

The data acquirer 631-1 may receive an image. The image may include a plurality of objects. For example, the data acquirer 631-1 may capture an image through the camera of the electronic device including the data learner 631. Or, the data acquirer 631-1 may acquire data through a server or an external device communicating with the electronic device.

The pre-processor 631-2 may pre-process the acquired data such that the acquired data is used for learning to determine a similarity between images. The pre-processor 631-2 may process the acquired data into a predetermined format such that the model learner 631-4 which will be described later uses the acquired data for learning to determine a similarity between images. For example, the pre-processor 631-2 may extract at least one object included in the acquired image from the acquired image. Also, the pre-processor 631-2 may process the extracted object into data having a predetermined format.

The training data selector 631-3 may select data required for learning from among the pre-processed data. The selected data may be provided to the model learner 631-4. The training data selector 631-3 may select the data required for learning from among the pre-processed data according to predetermined criterion for determining a similarity between images. Also, the training data selector 631-3 may select data according to criterion by learning of the model learner 631-4 which will be described later.

The training data selector 631-3 may select objects required for learning from among objects processed by the pre-processor 631-2. For example, the training data selector 631-3 may select only an object corresponding to a predetermined target from among the objects processed by the pre-processor 631-2, in order to learn a determination on a similarity between objects. Also, the training data selector 631-3 may select a plurality of images including a same object.

The model learner 631-4 may learn criterion for a determination on a similarity between images based on training data. Also, the model learner 631-4 may learn criterion for what training data will be used to determine a similarity between images.

For example, the model learner 631-4 may analyse a characteristic of each object included in the images to learn a determination on a similarity between the images. Also, when two objects are the same, the model learner 631-4 may learn a method by which analysis data about characteristics of the objects is identical to each other.

Also, the model learner 631-4 may learn a data recognition model that is used to determine a similarity by using training data. In this case, the data recognition model may have been constructed in advance. For example, the data recognition model may have been constructed in advance by receiving basic training data (e.g., a sample image, etc.).

The data recognition model may be constructed by considering an application field of the data recognition model, a purpose of learning, a computing performance of a device, etc. The data recognition model may be a model based on a neural network. For example, a model, such as a DNN, a Recurrent Neural Network (RNN), a Bidirectional Recurrent Deep Neural Network (BRDNN), may be used as the data recognition model, although not limited thereto.

According to various embodiments, when there are a plurality of data recognition models constructed in advance, the model learner 631-4 may determine a data recognition model having a high relevance between input training data and basic training data as a data recognition model that is to be learned. In this case, the basic training data may have been classified in advance according to data types, and the data recognition models may have been classified in advance according to data types. For example, the basic training data may have been classified in advance according to various criteria, such as regions where the training data has been created, times at which the training data has been created, sizes of the training data, genres of the training data, creators of the training data, kinds of objects in the training data, etc.

Also, the model learner 631-4 may learn the data recognition model by using a learning algorithm including error back-propagation or gradient descent.

Also, the model learner 631-4 may learn the data recognition model through, for example, supervised learning using training data as an input value. Also, the model learner 631-4 may learn the data recognition model through, for example, unsupervised learning that finds criterion for determining a similarity by itself learning a kind of data required for determining a similarity without any supervision. Also, the model learner 631-4 may learn the data recognition model through, for example, reinforcement learning using a feedback informing whether a result of a similarity determination according to learning is correct.

Also, after the data recognition model is learned, the model learner 631-4 may store the learned data recognition model. In this case, the model learner 631-4 may store the learned data recognition model in the memory of the electronic device including the data recognizer 632. Or, the model learner 631-4 may store the learned data recognition model in the memory of the electronic device including the data recognizer 632 which will be described later. Or, the model learner 631-4 may store the learned data recognition model in a memory of a server connected to the electronic device through a wired/wireless network.

In this case, the memory in which the learned data recognition model is stored may store, for example, a command or data related to at least another component of the electronic device, together. Also, the memory may store software and/or a program. The program may include, for example, a kernel, middleware, an application programming interface (API), and/or an application program (or "application"), etc.

The model evaluator 631-5 may input evaluation data to the data recognition model, and when a determination result output from the evaluation data fails to satisfy predetermined criterion, the model evaluator 6310-5 may instruct the model learner 631-4 to perform learning again. Herein, the evaluation data may be predetermined data for evaluating the data recognition model.

For example, the evaluation data may include data related to a similarity between a plurality of images. Also, for example, the evaluation data may include data for informing whether at least two or more objects are identical to each other.

For example, when the model evaluator 631-5 determines that a number or portion of evaluation data showing incorrect determination results among determination results of the learned data recognition model with respect to the evaluation data exceeds a predetermined threshold value, the model evaluator 631-5 may determine that the learned data recognition model has failed to satisfy the predetermined criterion. For example, it is assumed that the predetermined criterion is defined as 2%. In this case, when the learned data recognition model outputs wrong determination results with respect to more evaluation data than 20 evaluation data among a total of 1000 evaluation data, the model evaluator 631-5 may determine that the learned data recognition model is improper.

Meanwhile, when there are a plurality of learned data recognition models, the model evaluator 631-5 may determine whether each learned data recognition model satisfies the predetermined criterion, and determine a leaned data recognition model satisfying the predetermined criterion as a final data recognition model. In this case, when a plurality of learned data recognition models satisfy the predetermined criterion, the model evaluator 631-5 may determine a predetermined learned data recognition model or a predetermined number of learned data recognition models among the plurality of learned data recognition models in evaluation score order as a final data recognition model.

Meanwhile, at least one of the data acquirer 631-1, the pre-processor 631-2, the training data selector 631-3, the model learner 631-4, and the model evaluator 631-5 in the data learner 631 may be manufactured in the form of at least one hardware chip and mounted on the electronic device. For example, at least one of the data acquirer 631-1, the pre-processor 631-2, the training data selector 631-3, the model learner 631-4, and the model evaluator 631-5 may be manufactured in the form of a dedicated hardware chip for AI or as a part of a typical general-purpose processor (e.g., CPU or application processor) or a graphic dedicated processor (e.g., GPU) and mounted on various electronic devices as described above.

Also, the data acquirer 631-1, the pre-processor 631-2, the training data selector 631-3, the model learner 631-4, and the model evaluator 631-5 may be mounted on a single electronic device or on different electronic devices. For example, a part of the data acquirer 631-1, the pre-processor 631-2, the training data selector 631-3, the model learner 631-4, and the model evaluator 631-5 may be included in the electronic device, and the other part may be included in a server.

Also, at least one of the data acquirer 631-1, the pre-processor 631-2, the training data selector 631-3, the model learner 631-4, and the model evaluator 631-5 may be implemented as a software module. When at least one of the data acquirer 631-1, the pre-processor 631-2, the training data selector 631-3, the model learner 631-4, and the model evaluator 631-5 is implemented as a software module (or, a program module including an instruction), the software module may be stored in non-transitory computer readable media. Also, in this case, the at least one software module may be provided by OS or by a predetermined application. Or, a part of the at least one software module may be provided by OS and the other part may be provided by the predetermined application.

Figure 10:
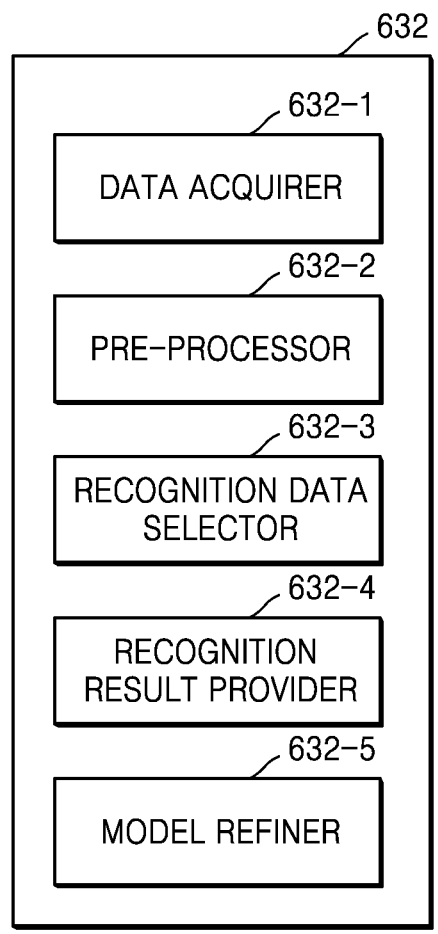
FIG. 10 is a block diagram illustrating in detail a data recognizer according to an embodiment.

FIG. 10 is a block diagram showing the data recognizer 632 according to an embodiment.

Referring to FIG. 10, the data recognizer 632 according to an embodiment may include a data acquirer 632-1, a pre-processor 632-2, a recognition data selector 632-3, a recognition result provider 632-4, and a model refiner 632-5.

The data acquirer 632-1 may acquire data required for determining a similarity between images, and the pre-processor 632-2 may pre-process the acquired data such that the data acquired for determining a similarity between images is used. The pre-processor 632-2 may process the acquired data into a predetermined format such that the recognition result provider 632-4 which will be described later uses the data acquired for determining the similarity between images.

The recognition data selector 632-3 may select data required for determining a similarity between images from among the pre-processed data. The selected data may be provided to the recognition result provider 632-4. The recognition data selector 632-3 may select the entire or a part of the pre-processed data according to predetermined criterion for determining a similarity between images. Also, the recognition data selector 632-3 may select data according to criterion determined in advance by learning of the model learner 631-4 which will be described later.

The recognition result provider 632-4 may apply the selected data to a data recognition model to determine a similarity between the images. The recognition result provider 632-4 may provide a result of recognition according to a purpose of data recognition. The recognition result provider 632-4 may use the data selected by the recognition data selector 632-3 as an input value to apply the selected data to the data recognition model. Also, the result of recognition may be determined by the data recognition model.

For example, a result of recognition of an input image may be provided as text, an image, or an instruction (e.g., an application execution instruction, a module function execution instruction, etc.). The recognition result provider 632-4 may apply a similarity between an object extracted from the image and an object included in data that is accessible by the electronic device to a data recognition model to provide a result of recognition. For example, the recognition result provider 632-4 may provide the object determined to be a similar object based on a determination on a similarity between the objects, in an image format. Or, the recognition result provider 632-4 may provide a name of the corresponding object, an address of a site for purchasing the corresponding object, etc., as a result of recognition.

The model refiner 632-5 may refine the data recognition model based on an evaluation on the result of recognition provided by the recognition result provider 632-4. For example, the model refiner 632-5 may provide the result of recognition provided by the recognition result provider 632-4 to the model learner 631-4 to cause the model learner 631-4 to refine the data recognition model.

Meanwhile, at least one of the data acquirer 632-1, the pre-processor 632-2, the recognition data selector 632-3, the recognition result provider 632-4, and the model refiner 632-5 in the data recognizer 632 may be manufactured in the form of at least one hardware chip and mounted on the electronic device. For example, at least one of the data acquirer 632-1, the pre-processor 632-2, the recognition data selector 632-3, the recognition result provider 632-4, and the model refiner 632-5 may be manufactured in the form of a dedicated hardware chip for AI or as a part of a typical general-purpose processor (e.g., CPU or application processor) or a graphic dedicated processor (e.g., GPU) and mounted on various electronic devices as described above.

Also, the data acquirer 632-1, the pre-processor 632-2, the recognition data selector 632-3, the recognition result provider 632-4, and the model refiner 632-5 may be mounted on a single electronic device or on different electronic devices. For example, a part of the data acquirer 632-1, the pre-processor 632-2, the recognition data selector 632-3, the recognition result provider 632-4, and the model refiner 632-5 may be included in the electronic device, and the other part may be included in a server.

Also, at least one of the data acquirer 632-1, the pre-processor 632-2, the recognition data selector 632-3, the recognition result provider 632-4, and the model refiner 632-5 may be implemented as a software module. When at least one of the data acquirer 632-1, the pre-processor 632-2, the recognition data selector 632-3, the recognition result provider 632-4, and the model refiner 632-5 is implemented as a software module (or, a program module including an instruction), the software module may be stored in non-transitory computer readable media. Also, in this case, the at least one software module may be provided by Operating System (OS) or by a predetermined application. Or, a part of the at least one software module may be provided by OS, and the other part may be provided by the predetermined application.

Figure 11:
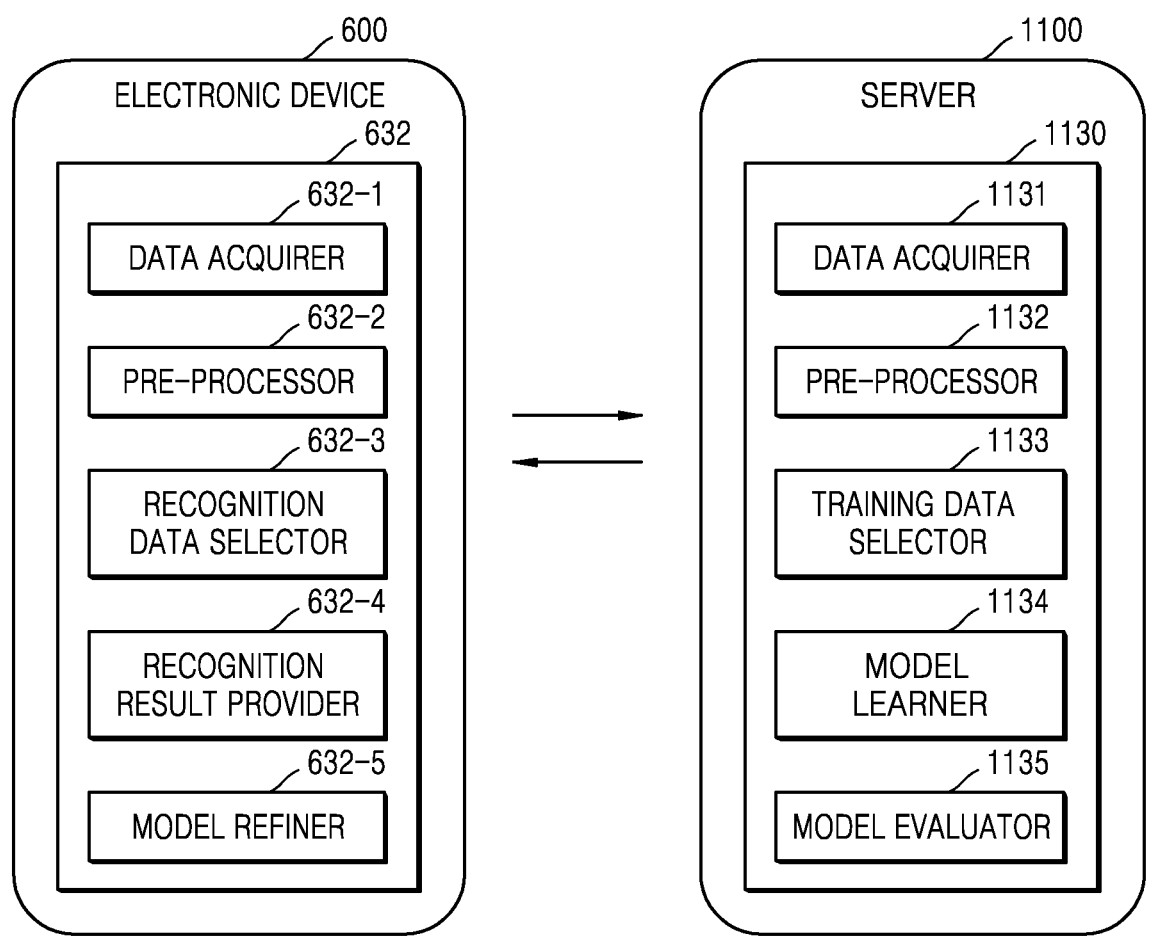
FIG. 11 shows an example of learning and recognizing data through interworking between a device and a server, according to an embodiment.

FIG. 11 shows an example of learning and recognizing data through interworking between a device and a server, according to an embodiment.

Referring to FIG. 11, the server 1100 may learn criterion for determining a similarity between images, and the electronic device 600 may determine a similarity between the images based on a result of learning by the server 1100.

In this case, a model learner 1134 of the server 1100 may perform a function of the data learner 631 shown in FIG. 9. The model learner 1134 of the server 1100 may learn criterion related to what data will be used to determine a similarity between predetermined images and how to determine a similarity between images using data. The model learner 1134 may acquire data that is to be used for learning, and apply the acquired data to a data recognition model which will be described later, thereby learning criterion for determining a similarity between images.

Also, the recognition result provider 632-4 of the electronic device 600 may apply data selected by the recognition data selector 632-3 to a data recognition model created by the server 1100 to determine a similarity between images. For example, the recognition result provider 632-4 may transmit the data selected by the recognition data selector 632-3 to the server 1100, and request the server 1100 to apply the data selected by the recognition data selector 632-3 to the data recognition model to determine a similarity between the images. Also, the recognition result provider 632-4 may receive information about the similarity between the images determined by the server 1100 from the server 1100.

Or, the recognition result provider 632-4 of the electronic device 600 may receive a recognition model created by the server 1100 from the server 1100, and determine a similarity between the images by using the received recognition model. In this case, the recognition result provider 632-4 of the electronic device 600 may apply the data selected by the recognition data selector 632-3 to the data recognition model received from the server 1100 to determine a similarity between the images.

Some embodiments may be implemented in the form of a computer-readable recording medium including an instruction that is executable by a computer, such as a program module that is executed by a computer. The computer-readable recording medium may be an arbitrary available medium which is able to be accessed by a computer, and may include a volatile or non-volatile medium and a separable or non-separable medium. Further, the computer-readable recording medium may include a computer storage medium. The computer storage medium may include volatile and non-volatile media and separable and non-separable media implemented by an arbitrary method or technology for storing information such as a computer readable instruction, a data structure, a program module, or other data.

Also, in the present specification, the term "unit" may be a hardware component such as a processor or a circuit, and/or a software component that is executed by a hardware component such as a processor.

It should be understood that the above descriptions of the present disclosure are merely for illustrative purposes, and therefore, it will be apparent that those skilled in the art can readily make various modifications thereto without changing the technical spirit and essential features of the present disclosure. Thus, it should be understood that the embodiments described above are merely for illustrative purposes and not for limitation purposes in all aspects. For example, each component described as a single type may be implemented in a distributed form, and likewise, components described in a distributed form may be implemented in a combined form.

The scope of the present disclosure is shown by the claims to be described below rather than the detailed description, and it is to be construed that the meaning and scope of the claims and all modifications or modified forms derived from the equivalent concept thereof are encompassed within the scope of the present disclosure.

The invention claimed is:

1. An electronic device comprising:
a memory storing computer executable instructions;
at least one processor configured to execute the computer executable instructions to detect an object included in an image, determine an image group corresponding to a first side of the detected object from among image groups, through matching between the image and the image groups each grouped for a same object, and estimate a front direction of the object of the determined image group in the image based on a photographing condition of the determined image group and a photographing condition of the image; and
an outputter configured to output information of the image group in the estimated front direction,
wherein the at least one processor is further configured to determine first similarities between the image and images of the image groups, and determine the image group corresponding to the object from among the image groups, based on a result of applying at least one weight to the first similarities, and
wherein the at least one weight is based on a difference between photographing conditions of the image estimated from the images of the image groups.

2. The electronic device of claim 1, wherein the photographing condition includes at least one of a photographing position and a photographing direction.

3. The electronic device of claim 2,
wherein the at least one processor is further configured to:
estimate the photographing condition of the image from a photographing condition of a representative image of the determined image group through matching between the image and the representative image, and
estimate a front direction of the object of the representative image in the image from a predetermined front direction of the object of the representative image, based on the estimated photographing condition of the image, and
wherein the outputter is further configured to display a graphical user interface (GUI) representing information of the image group in the estimated front direction.

4. The electronic device of claim 3, further comprising a user inputter configured to receive a user input of selecting the displayed GUI,
wherein the at least one processor is further configured to execute the computer executable instructions to access a site for purchasing the object of the image group based on the information of the image group.

5. The electronic device of claim 2, wherein the at least one processor is further configured to:
execute the computer executable instructions to determine second similarities between the image and the image groups, based on the first similarities and the photographing conditions of the image, and
determine an image group having the second similarity that is greater than or equal to a threshold value, as the image group corresponding to the detected object.

6. The electronic device of claim 5, wherein the at least one processor is further configured to multiply the first similarities by the at least one weight, and sum results of the multiplying.

7. The electronic device of claim 5, wherein the at least one processor is further configured to learn a criterion for determining the first similarities.

8. The electronic device of claim 1,
wherein when the image is a depth image, the at least one processor is further configured to determine a three-dimensional model corresponding to the detected object through matching between three-dimensional models of a plurality of objects and the depth image, and
wherein the outputter is further configured to output information of the three-dimensional model in a front direction of the object of the three-dimensional model in the depth image, based on depth information of the depth image.

9. The electronic device of claim 1, further comprising a sensor configured to track movement of a camera capturing the image,
wherein the at least one processor is further configured to estimate a front direction of the object of the determined image group in the image, based on the photographing condition of the determined image group and the photographing condition of the image changed according to the movement of the camera, and wherein the outputter is configured to output information of the image group in the front direction in the image.

10. The electronic device of claim 1, wherein the at least one processor is further configured to estimate the photographing condition of the image from the photographing condition of the determined image group through geometric verification.

11. A method of providing a recognition result of an object, comprising:

detecting an object included in an image;

determining an image group corresponding to a first side of the detected object from among image groups, through matching between the image and the image groups each grouped for a same object; and outputting information of the image group in a front direction of the object of the determined image group, estimated from the image, based on a photographing condition of the determined image group and a photographing condition of the image, wherein the determining of the image group corresponding to the detected object comprises:

determining first similarities between the image and images of the image groups, and determining the image group corresponding to the object from among the image groups, based on a result of applying at least one weight to the first similarities, and wherein the at least one weight is based on a difference between photographing conditions of the image estimated from the images of the image groups.

12. The method of claim 11, wherein the photographing condition includes at least one of a photographing position and a photographing direction.

13. The method of claim 12, wherein the outputting comprises:

estimating the photographing condition of the image from a photographing condition of a representative image of the determined image group through matching between the image and the representative image;

estimating a front direction of the object of the representative image in the image from a predetermined front direction of the object of the representative image, based on the estimated photographing condition; and displaying a graphical user interface (GUI) representing information of the image group in the estimated front direction.

14. The method of claim 12, wherein the determining of the image group corresponding to the detected object further comprises:

determining second similarities between the image and the image groups, based on the first similarities and the photographing conditions of the image; and determining an image group having a second similarity that is greater than or equal to a threshold value, as the image group corresponding to the detected object.

15. A computer-readable recording medium storing a program for executing the method of claim 11 on a computer.

* * * * *